United States Patent
Lin

(10) Patent No.: US 12,101,723 B2
(45) Date of Patent: Sep. 24, 2024

(54) APPARATUS AND METHOD FOR TRANSMISSION POWER CONTROL OF SAME

(71) Applicant: GUANGDONG OPPO MOBILE TELECOMMUNICATIONS CORP., LTD., Guangdong (CN)

(72) Inventor: Huei-Ming Lin, South Yarra (AU)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 190 days.

(21) Appl. No.: 17/481,043

(22) Filed: Sep. 21, 2021

(65) Prior Publication Data

US 2022/0007302 A1    Jan. 6, 2022

Related U.S. Application Data

(63) Continuation of application No. PCT/CN2020/079473, filed on Mar. 16, 2020.

(Continued)

(51) Int. Cl.
*H04W 52/24* (2009.01)
*H04B 17/318* (2015.01)
*H04W 92/18* (2009.01)

(52) U.S. Cl.
CPC ........ *H04W 52/242* (2013.01); *H04B 17/318* (2015.01); *H04W 92/18* (2013.01)

(58) Field of Classification Search
CPC . H04W 92/18; H04W 52/383; H04W 52/242; H04W 72/20; H04W 76/14; H04W 24/08; H04W 4/40; H04W 48/12; H04W 52/146; H04W 24/10; H04W 52/10; H04W 52/245; H04W 52/241; H04W 88/04;
(Continued)

(56) References Cited

U.S. PATENT DOCUMENTS

2016/0302094 A1  10/2016  Yum et al.
2018/0352404 A1  12/2018  Yi et al.
(Continued)

FOREIGN PATENT DOCUMENTS

CN   104349437 A   2/2015
CN   105722200 A   6/2016
(Continued)

OTHER PUBLICATIONS

Examination Report for Indian Application No. 202117044600 issued Apr. 6, 2022. 6 pages with English translation.
(Continued)

*Primary Examiner* — Ajibola A Akinyemi
(74) *Attorney, Agent, or Firm* — Perkins Coie LLP

(57) ABSTRACT

An apparatus and a method for transmission power control of the same capable of providing a good communication performance and high reliability are provided. A method for transmission power control of a first user equipment (UE) includes sending a trigger signaling to a second UE to request the second UE to report a sidelink—reference signal received power (SL-RSRP) measurement result, receiving, from the second UE, the SL-RSRP measurement report, and estimating a pathloss between the first UE and the second UE according to the reported SL-RSRP measurement result.

15 Claims, 4 Drawing Sheets

Related U.S. Application Data

(60) Provisional application No. 62/827,287, filed on Apr. 1, 2019.

(58) Field of Classification Search
CPC ... H04W 72/02; H04W 52/367; H04W 16/28; H04W 52/246; H04W 52/26; H04W 52/346; H04W 72/23; H04W 64/006; H04W 72/044
USPC .......................................................... 455/522
See application file for complete search history.

(56) References Cited

U.S. PATENT DOCUMENTS

| | | | |
|---|---|---|---|
| 2019/0037430 | A1 | 1/2019 | Lee et al. |
| 2020/0314770 | A1* | 10/2020 | Wu .......................... H04L 5/10 |
| 2021/0136694 | A1* | 5/2021 | Gao .................... H04W 52/245 |

FOREIGN PATENT DOCUMENTS

| | | |
|---|---|---|
| CN | 107735970 A | 2/2018 |
| CN | 108702244 A | 10/2018 |
| CN | 109246659 A | 1/2019 |
| EP | 3917224 A1 | 12/2021 |
| EP | 3917225 A1 | 12/2021 |
| WO | 2012075953 A1 | 6/2012 |
| WO | 2017171895 A1 | 10/2017 |
| WO | 2019029028 A1 | 2/2019 |
| WO | 2020164518 A1 | 8/2020 |
| WO | 2020175888 A1 | 9/2020 |

OTHER PUBLICATIONS

Extended European Search Report for European Application No. 20783502.6 issued Mar. 24, 2022.
OPPO "Physical layer procedure for NR-V2X sidelink" R1-1904920; 3GPP TSG RAN WG1 #96bis; Xi'an, China; Apr. 8-12, 2019. 8 pages.
Samsung "On Physical Layer Procedures for NR V2X" R1-1902274; 3GPP TSG RAN WG1 #96; Athens, Greece; Feb. 25-Mar. 1, 2019. 13 pages.
Examination Report for European Application No. 20783502.6 issued Mar. 15, 2023. 7 pages.
Examination Report No. 3 for Australian Application No. 2020255008 issued Mar. 10, 2023. 3 pages.
Intel Corporation "Physical Layer Procedures for NR V2X Sidelink Design" R1-1902482; 3GPP TSG RAN WG1 Ran1 #96; Athens, Greece; Feb. 25-Mar. 1, 2019. 14 pages.
Request for the Submission of an Opinion for Korean Application No. 10-2021-7034036 issued May 30, 2023. 10 pages with English translation.
Second Office Action for Chinese Application No. 202111342164.9 issued Apr. 1, 2023. 14 pages with English translation.
Examination Report for European Application No. 20783502.6 issued Nov. 4, 2022. 6 pages.
Examination Report No. 2 for Australian Application No. 2020255008 issued Dec. 8, 2022. 3 pages.
First Office Action for Chinese Application No. 2021113421649 issued Jan. 11, 2023. 16 pages with English translation.
Request for Submission of an Opinion for Korean Application No. 10-2021-7034036 issued Nov. 25, 2022. 10 pages with English translation.
International Search Report issued May 28, 2020 of PCT /CN2020/079473 (2 pages).
Huawei et al. "Sidelink measurements" R1-1903076; 3GPP TSG RAN WG1 Meeting #96; Athens, Greece; Feb. 25-Mar. 1, 2019. 5 pages.
Intel Corporation "Feature Lead Summary for NR-V2X AI—7.2.4.1.4 Resource Allocation Mechanism" R1-1903397; 3GPP TSG RAN WG1 Meeting #96; Athens, Greece; Feb. 25-Mar. 1, 2019. 18 pages.
Examination Report No. 1 for Australian Application No. 2020255008. Mail Date: Jul. 8, 2022. 4 pages.
LG Electronics Inc. "Discussion on SL-RSRP measurement and report procedures in NR SL" R1-1904886; 3GPP TSG RAN WG2 Meeting #105bis; Xi'an, China; Apr. 8-12, 2019. 5 pages.
Nokia et al. "Discussion on sidelink power control" R1-1714002; 3GPP TSG RAN WG1 Meeting #90; Prague, Czech Republic; Aug. 21-25, 2017. 4 pages.
Notice of Reasons for Rejection for Japanese Application No. 2021-557707. Mail Date: Jul. 29, 2022. 10 pages with English translation.
OPPO "Discussion on RRM for V2X" R2-1903679; 3GPP TSG RAN WG2 Meeting #105bis; Xi'an, China; Apr. 8-12, 2019. 4 pages.
First Office Action for Vietnam Application No. 1-2021-06420 issued Aug. 28, 2023, 4 Pages with English Translation.
First Office Action for Singapore Application No. 11202110851Q issued Jul. 28, 2023, 10 Pages.
Decision of Rejection of the CN application No. 202111342164.9, issued on Jun. 13, 2023. 15 pages with English translation.
Hearing Notice of the IN application No. 202117044600, issued on Aug. 1, 2023. 2 pages.
Third Office Action of the EP application No. 20783502.6, issued on Aug. 14, 2023. 7 pages.
CATT, CBR Measurement and Report 3GPP TSG RAN WG2 Meeting #96 R2-168106 Reno, USA, Nov. 14-18, 2016. R2-168106 4 pages.
Huawei, HiSilicon, Correction to sidelink synchronization operation in TS 36.331 3GPP TSG-RAN WG2 Meeting #97bis R2-1702505 Spokane, USA, Apr. 3-7, 2017, 2 pages.
Notice of Preliminary Rejection issued for Korean application No. 10-2021-7034036 on Feb. 25, 2024, 10 pages with English translation.
Notice of Reasons for Refusal issued for Japanese application No. 2022-197817 on Dec. 22, 2023, 8 pages with English translation.
First Office Action issued for Israeli application No. 286710 on Dec. 10, 2023, 4 pages.
Examination report issued for European application No. 20783502.6 on Jan. 11, 2024, 5 pages.
Hearing notice issued for Indian application No. 202117044600 on Feb. 19, 2024, 2 pages.
Spreadtrum Communications, Discussion on NR V2X physical layer procedure, 3GPP TSG RAN WG1#96 R1-1902724, 3GPP, Feb. 16, 2019, 8 pages.
Notice of Reasons for Refusal of the JP application No. 2022-197817, issued on May 31, 2024. 6 pages.
Intel Corporation , Physical Layer Procedures for NR V2X Sidelink Design , 3GPP TSG RAN WG1#96 Athens, Greece, Feb. 25-Mar. 1, 2019, R1-1903450. 15pages.
Samsung , Considerations on Sidelink CSI , 3GPP TSG RAN WG1#96, Athens, Greece, Feb. 25-Mar. 1, 2019, R1-1902279. 7pages.

* cited by examiner ardous # APPARATUS AND METHOD FOR TRANSMISSION POWER CONTROL OF SAME

CROSS-REFERENCE TO RELATED APPLICATION

The present application is a continuation application of International PCT Application No. PCT/CN2020/079473, filed on Mar. 16, 2020, which claims priority to U.S. Provisional Patent Application No. 62/827,287, filed on Apr. 1, 2019; the entire content of both applications are hereby incorporated by reference.

BACKGROUND OF DISCLOSURE

1. Field of the Disclosure

The present disclosure relates to the field of communication systems, and more particularly, to an apparatus and a method for transmission power control of the same, which can provide a good communication performance and high reliability.

2. Description of the Related Art

In current long term evolution (LTE) sidelink (SL) device-to-device (D2D) and vehicle-to-everything (V2X) communications, transmitting user equipment (UE) often uses maximum allowable output power for transmitting SL signals and channels in order to reach as large as possible wireless coverage areas to support mission critical services and road safety applications and at the same time to ensure that high reliability of wireless SL communication connections are maintained for a given required distance range. Moreover, for these types of applications and services, higher UE power class is additionally defined in 3rd generation partnership project (3GPP) with an expectation that UEs are required to transmit at even higher output power levels.

While traditionally this working principal of always using the maximum available output power may hold true for target use cases and services, but it imposes significant amount of load on UE battery consumption especially for portable devices such as tablets, smartphones, augmented reality/virtual reality (AR/VR) glasses, laptops, and etc., when wireless SL communication technologies are used for commercial services. Even for mission critical applications and V2X services, often there are UEs deployed in the field with limited power supply such as portable communication devices carried by emergency personnel and pedestrian UEs. For some advanced V2X use cases, furthermore, large wireless SL signal coverage may not be as critical when a target V2X communication range is only between cars that are close to each other, such as autonomous driving and sensor sharing. If UE's output power for SL transmissions can be reduced, not only UE battery power can be saved, but also the interferences that it would cause to surrounding UEs can be limited and thus improving overall system performance.

Therefore, there is a need for an apparatus and a method for transmission power control of the same, which can provide a good communication performance and high reliability.

SUMMARY

An object of the present disclosure is to propose an apparatus and a method for transmission power control of the same, which can provide a good communication performance and high reliability.

In a first aspect of the present disclosure, a first user equipment for transmission power control includes a memory, a transceiver, and a processor coupled to the memory and the transceiver. The processor is configured to control the transceiver to send a trigger signaling to a second UE to request the second UE to report a sidelink—reference signal received power (SL-RSRP) measurement result, control the transceiver to receive, from the second UE, the SL-RSRP measurement report, and estimate a pathloss between the first UE and the second UE according to the reported SL-RSRP measurement result.

In a second aspect of the present disclosure, a method for transmission power control of a first user equipment includes sending a trigger signaling to a second UE to request the second UE to report a sidelink—reference signal received power (SL-RSRP) measurement result, receiving, from the second UE, the SL-RSRP measurement report, and estimating a pathloss between the first UE and the second UE according to the reported SL-RSRP measurement result.

In a third aspect of the present disclosure, a second user equipment for transmission power control includes a memory, a transceiver, and a processor coupled to the memory and the transceiver. The processor is configured to be triggered, by a trigger signaling received from a first UE, to control the transceiver to report a sidelink—reference signal received power (SL-RSRP) measurement result and control the transceiver to report, to the first UE, the SL-RSRP measurement result.

In a fourth aspect of the present disclosure, a method for transmission power control of a second user equipment includes being triggered, by a trigger signaling received from a first UE, to report a sidelink—reference signal received power (SL-RSRP) measurement result and reporting, to the first UE, the SL-RSRP measurement result.

In a fifth aspect of the present disclosure, a non-transitory machine-readable storage medium has stored thereon instructions that, when executed by a computer, cause the computer to perform the above method.

In a sixth aspect of the present disclosure, a terminal device includes a processor and a memory configured to store a computer program. The processor is configured to execute the computer program stored in the memory to perform the above method.

In a seventh aspect of the present disclosure, a base station includes a processor and a memory configured to store a computer program. The processor is configured to execute the computer program stored in the memory to perform the above method.

In an eighth aspect of the present disclosure, a chip includes a processor, configured to call and run a computer program stored in a memory, to cause a device in which the chip is installed to execute the above method.

In a ninth aspect of the present disclosure, a computer readable storage medium, in which a computer program is stored, causes a computer to execute the above method.

In a tenth aspect of the present disclosure, a computer program product includes a computer program, and the computer program causes a computer to execute the above method.

In an eleventh of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In some embodiments of the present disclosure, receiver user equipment (UE) measurement and feedback to control transmitter UE's output power for sidelink (SL) data transmissions is provided to solve the above described issues of UE battery power consumption and generating unnecessary interferences to surrounding UEs. Benefits from adopting the proposed method of power control for wireless SL transmissions of some embodiments include:

1. Saving portable UE device's battery power, and this will lead to longer device operating time.
2. Minimizing interference to other surrounding nearby UEs, resulting in better SL system performance and more radio frequency reuse in more areas.
3. Minimizing interference to cellular uplink (UL) base station (BS) receiver and better cellular performance in a UL direction.
4. Better adaptation of SL transmission parameters to wireless channel environment, and this will lead to more reliable SL data transfer, better radio resource utilization, improved data throughput, and possibly shorter data transfer latency.

Figure 1:
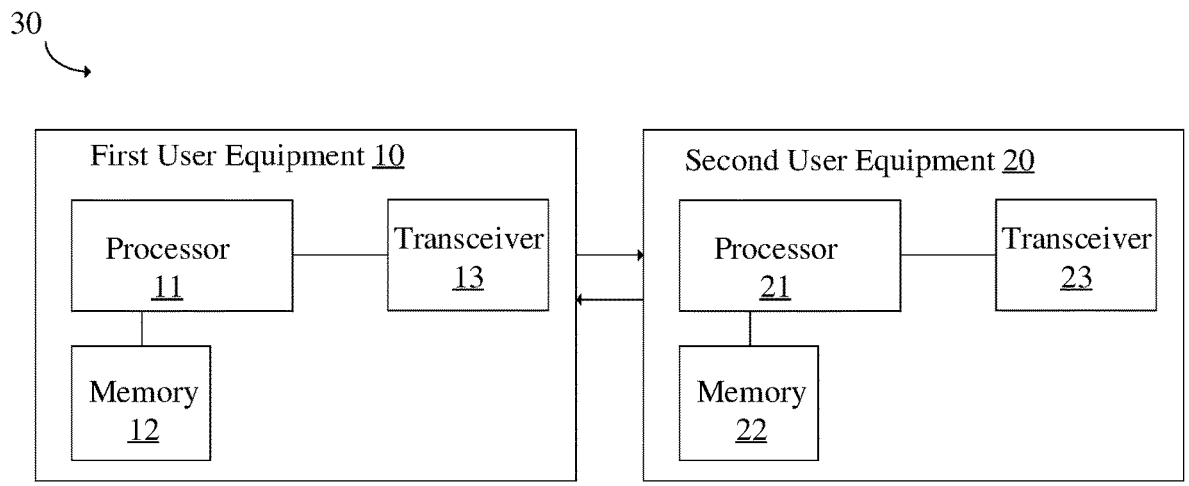
FIG. 1 is a block diagram of a first user equipment (UE) and a second user equipment for transmission power control in a communication network system according to an embodiment of the present disclosure.

FIG. 1 illustrates that, in some embodiments, a first user equipment (UE) 10 and a second user equipment 20 for transmission power control in a communication network system 30 according to an embodiment of the present disclosure are provided. The communication network system 30 includes the first UE 10 and the second UE 20. The first UE 10 may include a memory 12, a transceiver 13, and a processor 11 coupled to the memory 12, the transceiver 13. The second UE 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some embodiments of the present disclosure relate to sidelink communication technology in 3GPP NR release 16 and beyond.

In some embodiments, the processor 11 is configured to control the transceiver 13 to send a trigger signaling to the second UE 20 to request the second UE 20 to report a sidelink—reference signal received power (SL-RSRP) measurement result, control the transceiver 13 to receive, from the second UE 20, the SL-RSRP measurement report, and estimate a pathloss between the first UE 10 and the second UE 20 according to the reported SL-RSRP measurement result. Benefits from adopting the proposed method of power control for wireless SL transmissions of some embodiments include: 1. Saving portable UE device's battery power, and this will lead to longer device operating time. 2. Minimizing interference to other surrounding nearby UEs, resulting in better SL system performance and more radio frequency reuse in more areas. 3. Minimizing interference to cellular uplink (UL) base station (BS) receiver and better cellular performance in a UL direction. 4. Better adaptation of SL transmission parameters to wireless channel environment, and this will lead to more reliable SL data transfer, better radio resource utilization, improved data throughput, and possibly shorter data transfer latency.

In some embodiments, the trigger signaling indicates a SL-RSRP measurement reporting interval or a reporting slot number. In some embodiments, the trigger signaling for the SL-RSRP measurement reporting is part of sidelink control information (SCI), which is to be encoded and transmitted in a physical sidelink control channel (PSCCH) signaling, or a radio resource control (RRC) signaling. In some embodiments, the transceiver 13 is further configured to transmit, to the second UE 20, a de-modulation reference signal (DMRS) of physical sidelink shared channel (PSSCH) for the purpose of SL-RSRP measurement at the second UE 20 and the second UE 20 is configured to perform the SL-RSRP measurement based on the transmitted DMRS of the PSSCH.

In some embodiments, the trigger signaling includes a SL-RSRP measurement period or a slot number as a part of sidelink control information (SCI), which is to be encoded and transmitted in a physical sidelink control channel (PSCCH). In some embodiments, the transceiver 13 is further configured to transmit, to the second UE 20, a de-modulation reference signal (DMRS) of the PSSCH and the processor 11 is configured to request the second UE 20 to measure the SL-RSRP measurement result according to the DMRS of the PSSCH. In some embodiments, the transceiver 13 is further configured to receive, from the second UE 20, the SL-RSRP measurement report via the PSSCH.

In some embodiments, the pathloss between the first UE 10 and the second UE 20 is estimated according to a reference SL transmission power level used for transmitting the PSSCH from the first UE 10 to the second UE 20. In some embodiments, the pathloss between the first UE 10 and the second UE 20 is estimated by calculating the following: the pathloss between the first UE 10 and the second UE 20 is equal to a reference SL transmission power level used for transmitting the PSSCH from the first UE 10 to the second UE 20 minus the received SL-RSRP measurement result. In some embodiments, the processor 11 is further configured to determine a new SL transmission power level used for transmitting the PSSCH from the first UE 10 to the second UE 20. In some embodiments, the new SL transmission power level is determined according to at least one of an estimated pathloss value, a modulation and coding scheme (MCS) level, an allocation of frequency resource blocks (RBs), a size of frequency RBs, and a packet transport block (TB) size. In some embodiments, the reported SL-RSRP measurement result comprises measured SL-RSRP levels, and the measured SL-RSRP levels are averaged via layer 3 filtering.

In some embodiments, the processor 21 is configured to be triggered, by a trigger signaling received from the first UE 10, to control the transceiver 23 to report a sidelink—reference signal received power (SL-RSRP) measurement result and control the transceiver 23 to report, to the first UE 10, the SL-RSRP measurement result. Benefits from adopting the proposed method of power control for wireless SL transmissions of some embodiments include: 1. Saving portable UE device's battery power, and this will lead to longer device operating time. 2. Minimizing interference to other surrounding nearby UEs, resulting in better SL system performance and more radio frequency reuse in more areas. 3. Minimizing interference to cellular uplink (UL) base station (BS) receiver and better cellular performance in a UL direction. 4. Better adaptation of SL transmission parameters to wireless channel environment, and this will lead to more reliable SL data transfer, better radio resource utilization, improved data throughput, and possibly shorter data transfer latency.

In some embodiments, the trigger signaling indicates a SL-RSRP measurement reporting interval or a reporting slot number. In some embodiments, the trigger signaling for the SL-RSRP measurement reporting is part of sidelink control information (SCI), which is to be encoded and transmitted in a physical sidelink control channel (PSCCH) signaling, or a radio resource control (RRC) signaling. In some embodiments, the transceiver 23 is further configured to received, from the first UE 10, a de-modulation reference signal (DMRS) of physical sidelink shared channel (PSSCH) for the purpose of SL-RSRP measurement at the second UE 20 and the second UE 20 is configured to perform the SL-RSRP measurement based on the transmitted DMRS of the PSSCH.

In some embodiments, the trigger signaling includes a SL-RSRP measurement period or a slot number as a part of sidelink control information (SCI), which is to be encoded and transmitted in a physical sidelink control channel (PSCCH). In some embodiments, the transceiver 23 is further configured to receive, from the first UE 10, a de-modulation reference signal (DMRS) of the PSSCH and the processor 21 is configured to measure the SL-RSRP measurement result according to the DMRS of the PSSCH. In some embodiments, the transceiver 23 is further configured to transmit, to the first UE 10, the SL-RSRP measurement report via the PSSCH. In some embodiments, a pathloss between the first UE 10 and the second UE 20 is estimated according to at least one of the SL-RSRP measurement result and a reference SL transmission power level used for transmitting the PSSCH from the first UE 10 to the second UE 20. In some embodiments, a pathloss between the first UE 10 and the second UE 20 is estimated by calculating the following: the pathloss between the first UE 10 and the second UE 20 is equal to a reference SL transmission power level used for transmitting the PSSCH from the first UE 10 to the second UE 20 minus the reported SL-RSRP measurement result.

Figure 2:
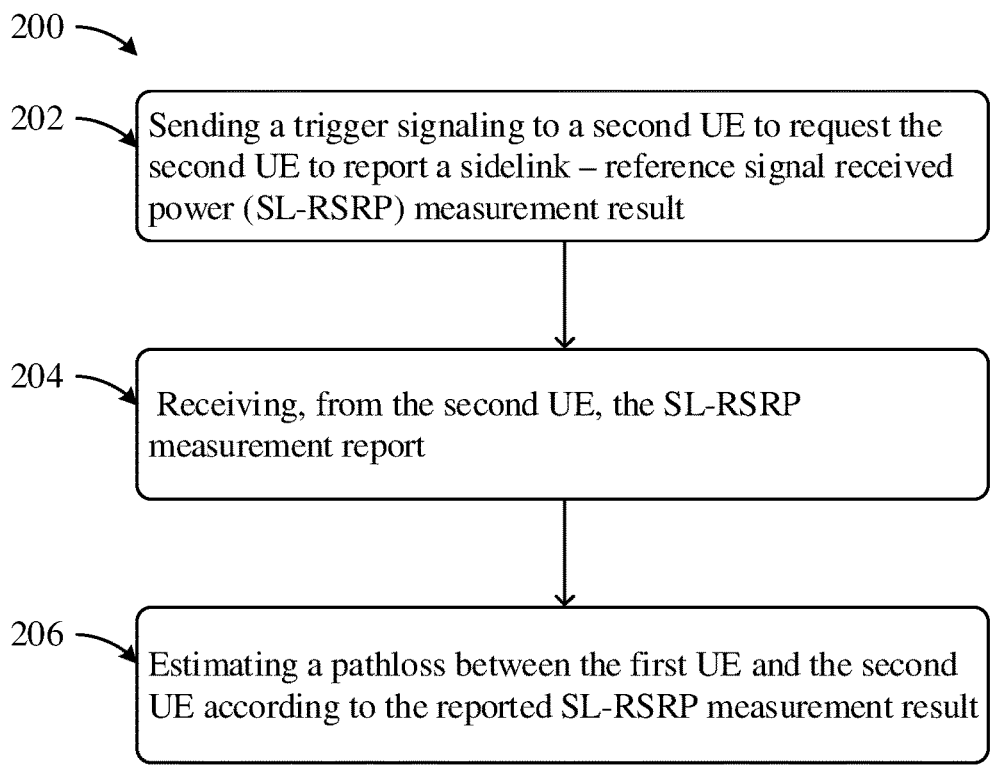
FIG. 2 is a flowchart illustrating a method for transmission power control of a first user equipment according to an embodiment of the present disclosure.

FIG. 2 illustrates a method 200 for transmission power control of a first UE according to an embodiment of the present disclosure. In some embodiments, the method 200 includes: a block 202, sending a trigger signaling to a second UE to request the second UE to report a sidelink—reference signal received power (SL-RSRP) measurement result, a block 204, receiving, from the second UE, the SL-RSRP measurement report, and a block 206, estimating a pathloss between the first UE and the second UE according to the reported SL-RSRP measurement result. Benefits from adopting the proposed method of power control for wireless SL transmissions of some embodiments include: 1. Saving portable UE device's battery power, and this will lead to longer device operating time. 2. Minimizing interference to other surrounding nearby UEs, resulting in better SL system performance and more radio frequency reuse in more areas. 3. Minimizing interference to cellular uplink (UL) base station (BS) receiver and better cellular performance in a UL direction. 4. Better adaptation of SL transmission parameters to wireless channel environment, and this will lead to more reliable SL data transfer, better radio resource utilization, improved data throughput, and possibly shorter data transfer latency.

In some embodiments, the trigger signaling indicates a SL-RSRP measurement reporting interval or a reporting slot number. In some embodiments, the trigger signaling for the SL-RSRP measurement reporting is part of sidelink control information (SCI), which is to be encoded and transmitted in a physical sidelink control channel (PSCCH) signaling, or a radio resource control (RRC) signaling. In some embodiments, the method further comprises transmitting, to the second UE, a de-modulation reference signal (DMRS) of physical sidelink shared channel (PSSCH) for the purpose of SL-RSRP measurement at the second UE and the second UE is configured to perform the SL-RSRP measurement based on the transmitted DMRS of the PSSCH.

In some embodiments, the trigger signaling includes a SL-RSRP measurement period or a slot number as a part of sidelink control information (SCI), which is to be encoded and transmitted in a physical sidelink control channel (PSCCH). In some embodiments, the method further includes transmitting, to the second UE, a de-modulation reference signal (DMRS) of the PSSCH and requesting the second UE to measure the SL-RSRP measurement result according to the DMRS of the PSSCH. In some embodiments, the method further includes receiving, from the second UE, the SL-RSRP measurement report via the PSSCH.

In some embodiments, the pathloss between the first UE and the second UE is estimated according to a reference SL transmission power level used for transmitting the PSSCH from the first UE to the second UE. In some embodiments, the pathloss between the first UE and the second UE is estimated by calculating the following: the pathloss between the first UE and the second UE is equal to a reference SL transmission power level used for transmitting the PSSCH from the first UE to the second UE minus the reported SL-RSRP measurement result. In some embodiments, the method further includes determining a new SL transmission power level used for transmitting the PSSCH from the first UE to the second UE. In some embodiments, the new SL transmission power level is determined according to at least one of an estimated pathloss value, a modulation and coding scheme (MCS) level, an allocation of frequency resource blocks (RBs), a size of frequency RBs, and a packet transport block (TB) size. In some embodiments, the reported SL-RSRP measurement result comprises measured SL-RSRP levels, and the measured SL-RSRP levels are averaged via layer 3 filtering.

Figure 3:
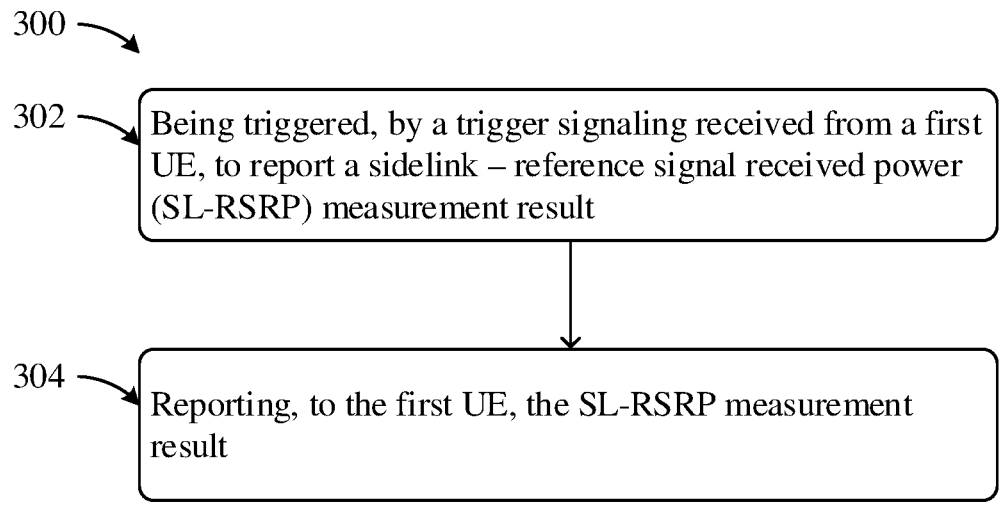
FIG. 3 is a flowchart illustrating a method for transmission power control of a second user equipment according to an embodiment of the present disclosure.

FIG. 3 illustrates a method 300 for transmission power control of a second UE according to an embodiment of the present disclosure. In some embodiments, the method 300 includes: a block 302, being triggered, by a trigger signaling received from a first UE, to report a sidelink—reference signal received power (SL-RSRP) measurement result, and a block 304, reporting, to the first UE, the SL-RSRP measurement result. Benefits from adopting the proposed method of power control for wireless SL transmissions of some embodiments include: 1. Saving portable UE device's battery power, and this will lead to longer device operating time. 2. Minimizing interference to other surrounding nearby UEs, resulting in better SL system performance and more radio frequency reuse in more areas. 3. Minimizing interference to cellular uplink (UL) base station (BS) receiver and better cellular performance in a UL direction. 4. Better adaptation of SL transmission parameters to wireless channel environment, and this will lead to more reliable SL data transfer, better radio resource utilization, improved data throughput, and possibly shorter data transfer latency.

In some embodiments, the trigger signaling indicates a SL-RSRP measurement reporting interval or a reporting slot number. In some embodiments, the trigger signaling for the SL-RSRP measurement reporting is part of sidelink control information (SCI), which is to be encoded and transmitted in a physical sidelink control channel (PSCCH) signaling, or a radio resource control (RRC) signaling. In some embodiments, the method further comprises receiving, from the first UE, a de-modulation reference signal (DMRS) of physical sidelink shared channel (PSSCH) for the purpose of SL-RSRP measurement at the second UE and the second UE is configured to perform the SL-RSRP measurement based on the transmitted DMRS of the PSSCH.

In some embodiments, the trigger signaling includes a SL-RSRP measurement period or a slot number as a part of sidelink control information (SCI), which is to be encoded and transmitted in a physical sidelink control channel (PSCCH). In some embodiments, the method further includes receiving, from the first UE, a de-modulation reference signal (DMRS) of the PSSCH and measuring the SL-RSRP measurement result according to the DMRS of the PSSCH. In some embodiments, the method further includes transmitting, to the first UE, the SL-RSRP measurement report via the PSSCH. In some embodiments, a pathloss between the first UE and the second UE is estimated according to at least one of the SL-RSRP measurement result and a reference SL transmission power level used for transmitting the PSSCH from the first UE to the second UE. In some embodiments, a pathloss between the first UE and the second UE is estimated by calculating the following: the pathloss between the first UE and the second UE is equal to a reference SL transmission power level used for transmitting the PSSCH from the first UE to the second UE minus the SL-RSRP measurement result.

Figure 4:
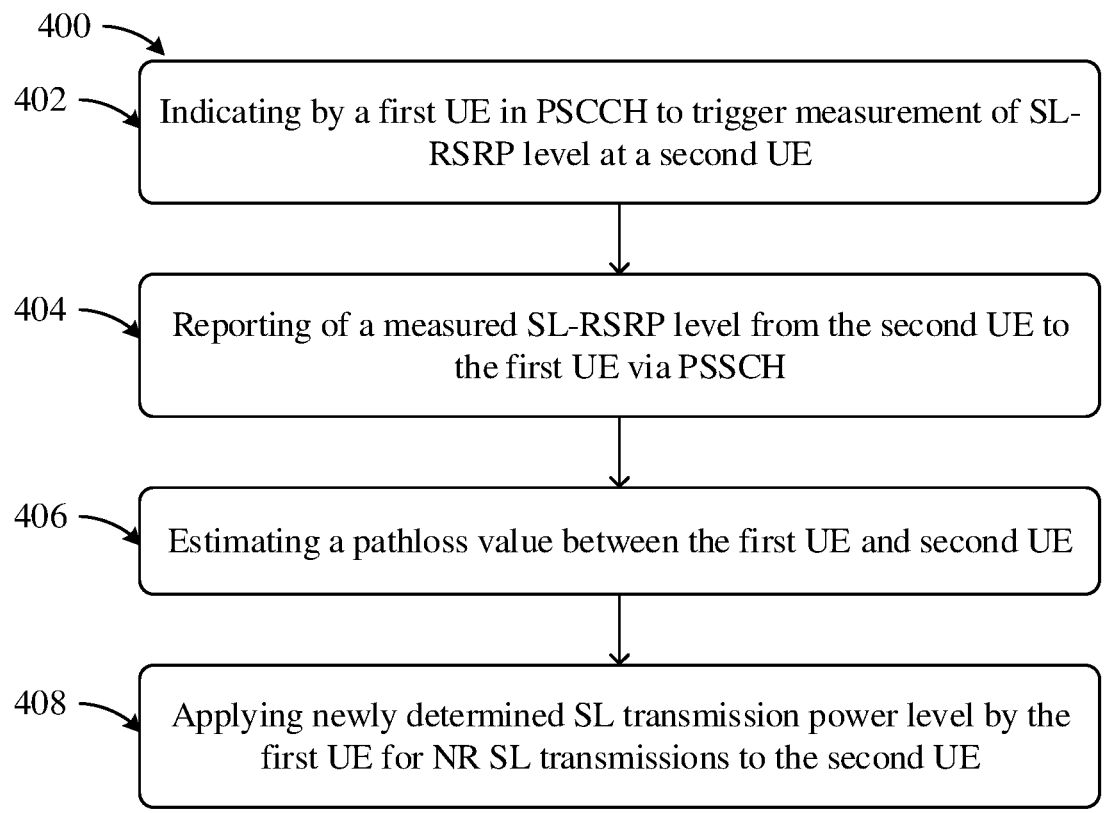
FIG. 4 is a flowchart illustrating a method of controlling UE transmission power in a new radio (NR) sidelink communication according to an embodiment of the present disclosure.
Figure 5:
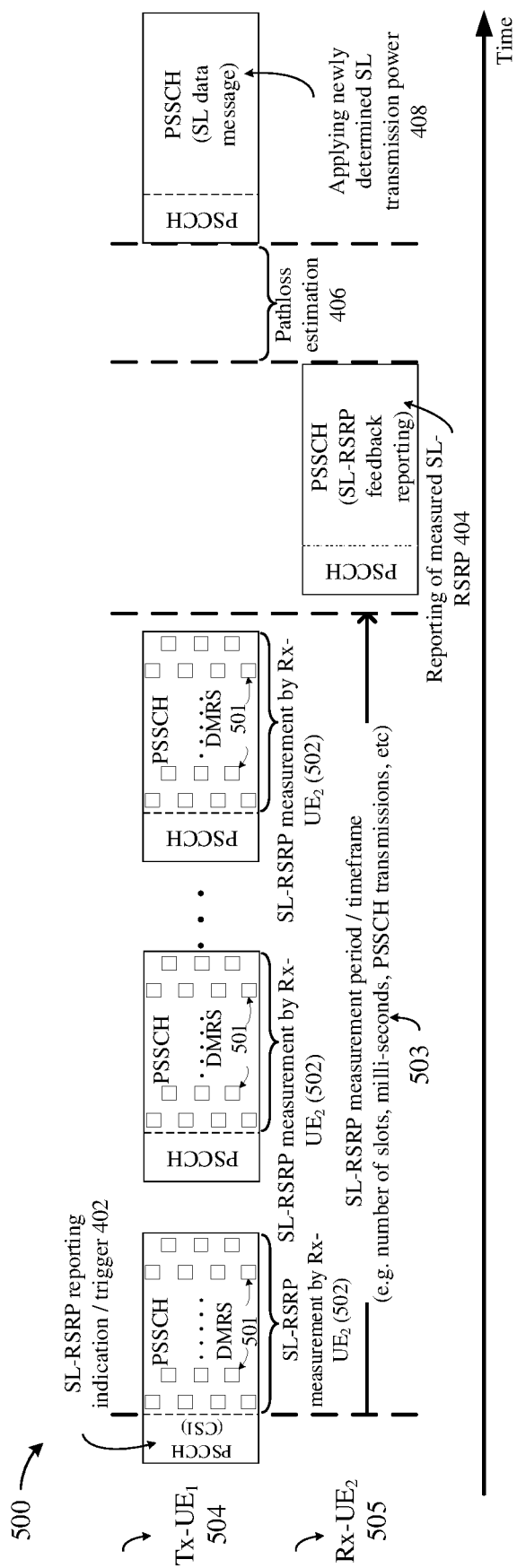
FIG. 5 is an exemplary illustration of a proposed method of UE power control for a NR sidelink communication involving a first UE for transmission, pathloss estimation, and applying new transmission power level and a second UE for received power measurement and providing feedback report according to an embodiment of the present disclosure.

FIG. 4 is a flowchart illustrating a method of controlling UE transmission power in a new radio (NR) sidelink communication according to an embodiment of the present disclosure. FIG. 5 is an exemplary illustration of a proposed method of UE power control for a NR sidelink communication involving a first UE for transmission, pathloss estimation, and applying new transmission power level and a second UE for received power measurement and providing feedback report according to an embodiment of the present disclosure.

In some embodiments of the present disclosure, a proposed method provides controlling transmission power of SL signals and channels for a first UE (transmit UE1, Tx-UE1) towards at least one second UE (receiver UE2, Rx-UE2) which is configured to receive SL data from the first UE, in reference to diagrams 400 and 500 in FIG. 4 and FIG. 5 respectively. A Tx-UE1 504 first triggers a Rx-UE2 505 to report a sidelink—reference signal received power (SL-RSRP) by indicating a SL-RSRP measurement period/timeframe or reporting slot number as part of sidelink control information (SCI), which is to be encoded and transmitted in PSCCH at an operation 402. A SL-RSRP measurement period/timeframe 503 indicated in SCI for the Rx-UE2 505 could be expressed as a number of NR slots, milli-seconds, or number of PSSCH transmissions from the Tx-UE1 504.

Once the Rx-UE2 505 received the SL-RSRP reporting triggering indicated in PSCCH SCI at the operation 402, the Rx-UE2 505 performs measurements of SL-RSRP level according to the indicated measurement period/timeframe 503. If the timing for which the Rx-UE2 505 can provide SL-RSRP measurement report is expressed as a NR (D2D frame number) direct frame number (DFN) or slot number, the Rx-UE2 505 can perform SL-RSRP measurement on every PSSCH transmitted at an operation 502 from the Tx-UE1 504 intended for the Rx-UE2 505. If the SL-RSRP measurement period/timeframe is expressed as a time length duration or a number of PSSCH transmissions, the Rx-UE2 505 can perform SL-RSRP measurement on every PSSCH transmitted at the operation 502 from the Tx-UE1 504 intended for the Rx-UE2 505 during the measurement period/timeframe 503.

Furthermore, if the Tx-UE1 504 transmits more than one PSSCH intended for the Rx-UE2 505 during the measurement period/timeframe, the Rx-UE2 505 can perform SL-RSRP measurement per PSSCH transmission at the operation 502 and average across the multiple measured SL-RSRP levels by means of layer 3 filtering. If only one PSSCH is transmitted from the Tx-UE1 504 intended for the Rx-UE2 505 during the measurement period/timeframe 503, the Rx-UE2 505 can perform SL-RSRP measurement only on the transmitted PSSCH intended for it and no layer 3 filtering or averaging can be applied.

Furthermore, the Rx-UE2 505 can assume a constant transmission power applied across all PSSCH transmissions from the Tx-UE1 504 intended for it after the SL-RSRP reporting triggering at the operation 402 and during the measurement period/timeframe 503. In addition, the measurement of SL-RSRP level can be performed by the Rx-UE2 505 based on de-modulation reference signal (DMRS) 501 of PSSCH transmitted from the Tx-UE1 504. Lastly, it is not necessary to indicate an actual transmission power used to transmit PSSCH and/or DMRS from the Tx-UE1 504 for a purpose of SL-RSRP measurement for SL power control.

After the indicated SL-RSRP measurement period/timeframe, the Rx-UE2 505 can report/feedback its measured, and if applicable, filtered final SL-RSRP level via its own PSSCH transmission at an operation 404 to the Tx-UE1 504. If during the SL-RSRP reporting the Rx-UE2 505 also has SL data transport block (TB) to be transmitted to the Tx-UE1 504 in the same slot or subframe, the final SL-RSRP level will be transmitted together with PSSCH in a PSSCH region of SL transmission, but not encoded as part of PSSCH. If during the SL-RSRP reporting the Rx-UE2 505 also has no SL data transport block (TB) to be transmitted to the Tx-UE1 504 in the same slot or subframe, then in this case the final SL-RSRP level will be encoded and transmitted as per PSSCH to the Tx-UE1 504.

Once the Tx-UE1 504 receives the SL-RSRP report from the Rx-UE2 505, the Tx-UE1 504 estimates a pathloss value at an operation 406 based on the received SL-RSRP report and the transmission power used to transmit PSSCH during the SL-RSRP measurement period/timeframe, according to a simple calculation: pathloss=Tx power used for transmitting PSSCH—reported SL-RSRP level. Subsequently, a new SL transmission power can be determined by the Tx-UE1 504 and applied to the next or future PSSCH transmissions carrying SL data messages intended for the same Rx-UE2 505 in an operation 408. The determination of new SL transmission power can be based on at least one of the estimated pathloss value, selected MCS level, frequency RBs allocation/size, and SL data TB size.

In summary, an aspect (system level) of some embodiments provides a method of controlling transmission power of NR physical sidelink channel and signal for a first UE based on measurement feedback from at least one second UE. The method includes indicating by the first UE in PSCCH SCI to trigger measurement of SL-RSRP level at the second UE, reporting of a measured SL-RSRP level from the second UE to the first UE via PSSCH, and estimating a pathloss value between the first UE and second UE. The method further includes applying newly determined SL transmission power level by the first UE for NR SL transmissions to the second UE. In some embodiments, the indication includes at least a SL-RSRP measurement period/timeframe. In some embodiments, the measurement of SL-RSRP is based on PSSCH-DMRS transmitted from the first UE. In some embodiments, the measurement feedback is conveyed via PSSCH from the second UE. In some embodiments, the pathloss can be estimated by calculating the following: Pathloss=Tx power used for transmitting PSSCH—reported SL-RSRP level. In some embodiments, the new SL transmission power level is determined based on at least one of the estimated pathloss value, MCS level, frequency RBs allocation/size, and packet TB size.

Another aspect (first Tx-UE1) of some embodiments provides a method of controlling transmission power of NR physical sidelink channel and signal for a first UE based on measurement feedback from at least one second UE. The method includes triggering by the first UE of SL-RSRP measurement and reporting from the second UE, receiving from the second UE a SL-RSRP measurement result, and estimating a pathloss between the first and second UEs based on received SL-RSRP value and the reference SL transmission power level used for transmitting PSSCH from the first UE to the second UE. The method further includes determining a new SL transmission power level to be used by the first UE for transmitting PSSCH to the second UE based on at least one of the estimated pathloss value, MCS level, frequency RBs allocation/size, and packet TB size.

Another aspect (second Rx-UE2) of some embodiments provides a method of controlling transmission power of NR physical sidelink channel and signal for a first UE based on measurement feedback from at least one second UE. The method includes receiving a SL-RSRP measurement trigger in PSSCH SCI from the first UE, measuring SL-RSRP level(s) based on DMRS associated with PSSCH(s) transmitted from the first UE, and reporting a final SL-RSRP value in PSSCH to the first UE via PSSCH.

Commercial interests for some embodiments are as follows. 1. Saving portable UE device's battery power, and this will lead to longer device operating time. 2. Minimizing interference to other surrounding nearby UEs, resulting in better SL system performance and more radio frequency reuse in more areas. 3. Minimizing interference to cellular uplink (UL) base station (BS) receiver and better cellular performance in a UL direction. 4. Better adaptation of SL transmission parameters to wireless channel environment, and this will lead to more reliable SL data transfer, better radio resource utilization, improved data throughput, and possibly shorter data transfer latency. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product.

Figure 6:
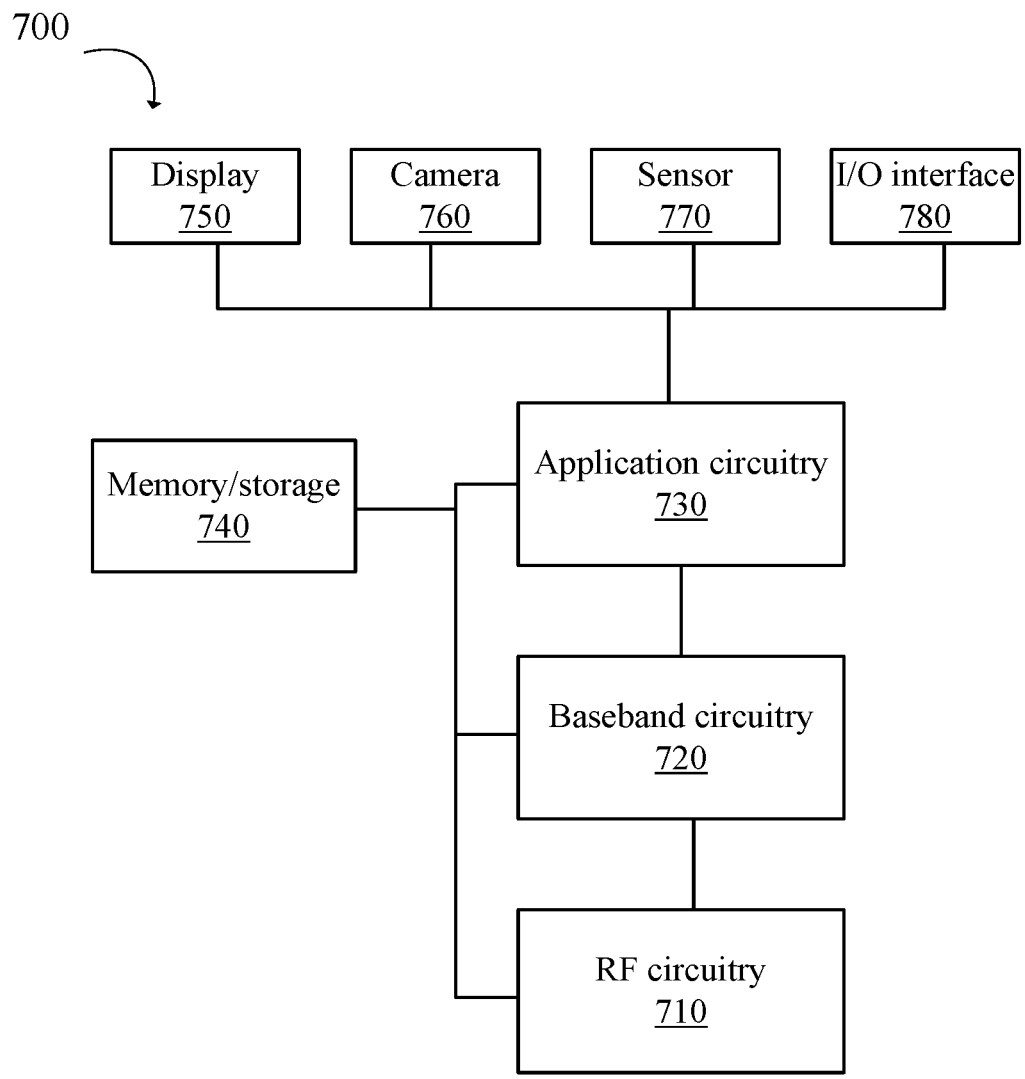
FIG. 6 is a block diagram of a system for wireless communication according to an embodiment of the present disclosure.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A first user equipment (UE) for transmission power control, comprising:
    a memory;
    a transceiver; and
    a processor coupled to the memory and the transceiver;
    wherein the processor is configured to:
        control the transceiver to send a trigger signaling to a second UE to request the second UE to report a sidelink—reference signal received power (SL-RSRP) measurement result;
        control the transceiver to receive, from the second UE, the SL-RSRP measurement report; and
    estimate a pathloss between the first UE and the second UE according to the reported SL-RSRP measurement result;
    wherein the pathloss between the first UE and the second UE is estimated according to a reference SL transmission power level used for transmitting physical sidelink shared channel (PSSCH) from the first UE to the second UE;
    the trigger signaling indicates a SL-RSRP measurement reporting interval.

2. The first user equipment of claim 1, wherein the trigger signaling for the SL-RSRP measurement reporting is part of a radio resource control (RRC) signaling.

3. The first user equipment of claim 1, wherein the transceiver is further configured to transmit, to the second UE, a de-modulation reference signal (DMRS) of the PSSCH for the purpose of SL-RSRP measurement at the second UE.

4. The first user equipment of claim 1, wherein the transceiver is further configured to receive, from the second UE, the SL-RSRP measurement report via the PSSCH.

5. The first user equipment of claim 1, wherein the pathloss between the first UE and the second UE is estimated by calculating the following: the pathloss between the first UE and the second UE is equal to a reference SL transmission power level used for transmitting the PSSCH from the first UE to the second UE minus the reported SL-RSRP measurement result.

6. The first user equipment of claim 1, wherein the processor is further configured to determine a new SL transmission power level used for transmitting the PSSCH from the first UE to the second UE according to the estimated pathloss value.

7. The first user equipment of claim 1, wherein the reported SL-RSRP measurement result comprises measured SL-RSRP levels, and the measured SL-RSRP levels are averaged via layer 3 filtering.

8. A method for transmission power control of a first user equipment, comprising:
    sending a trigger signaling to a second UE to request the second UE to report a sidelink—reference signal received power (SL-RSRP) measurement result;
    receiving, from the second UE, the SL-RSRP measurement report; and
    estimating a pathloss between the first UE and the second UE according to the reported SL-RSRP measurement result;
    wherein the pathloss between the first UE and the second UE is estimated according to a reference SL transmission power level used for transmitting physical sidelink shared channel (PSSCH) from the first UE to the second UE;
    the trigger signaling indicates a SL-RSRP measurement reporting interval.

9. The method of claim 8, wherein the trigger signaling for the SL-RSRP measurement reporting is part of a radio resource control (RRC) signaling.

10. The method of claim 8, further comprising transmitting, to the second UE, a de-modulation reference signal (DMRS) of the PSSCH for the purpose of SL-RSRP measurement at the second UE.

11. The method of claim 8, further comprising receiving, from the second UE, the SL-RSRP measurement report via the PSSCH.

12. The method of claim 8, wherein the pathloss between the first UE and the second UE is estimated by calculating the following: the pathloss between the first UE and the second UE is equal to a reference SL transmission power level used for transmitting the PSSCH from the first UE to the second UE minus the reported SL-RSRP measurement result.

13. The method of claim 8, further comprising determining a new SL transmission power level used for transmitting the PSSCH from the first UE to the second UE according to the estimated pathloss value.

14. The method of claim 8, wherein the reported SL-RSRP measurement result comprises measured SL-RSRP levels, and the measured SL-RSRP levels are averaged via layer 3 filtering.

15. A non-transitory machine-readable storage medium having stored thereon instructions that, when executed by a computer, cause the computer to perform the method of claim 8.

* * * * *